(12) United States Patent
Mukoyama et al.

(10) Patent No.: US 12,492,903 B2
(45) Date of Patent: Dec. 9, 2025

(54) NAVIGATION DEVICE AND METHOD OF MANUFACTURING NAVIGATION DEVICE

(71) Applicant: JVCKENWOOD Corporation, Yokohama (JP)

(72) Inventors: Takuya Mukoyama, Yokohama (JP); Kazumoto Okamoto, Yokohama (JP); Hisaki Tanaka, Yokohama (JP)

(73) Assignee: JVCKENWOOD CORPORATION, Yokohama (JP)

( * ) Notice: Subject to any disclaimer, the term of this patent is extended or adjusted under 35 U.S.C. 154(b) by 662 days.

(21) Appl. No.: 17/871,218

(22) Filed: Jul. 22, 2022

(65) Prior Publication Data

US 2022/0397398 A1    Dec. 15, 2022

Related U.S. Application Data

(63) Continuation of application No. PCT/JP2021/001253, filed on Jan. 15, 2021.

(30) Foreign Application Priority Data

Feb. 28, 2020   (JP) .................................. 2020-033583
Feb. 28, 2020   (JP) .................................. 2020-033587

(51) Int. Cl.
*G01C 21/16* (2006.01)
*G01C 21/26* (2006.01)
(Continued)

(52) U.S. Cl.
CPC ........... *G01C 21/16* (2013.01); *G01C 21/265* (2013.01); *G01P 1/023* (2013.01); *G01P 15/18* (2013.01)

(58) Field of Classification Search
CPC ....... G01C 21/16; G01C 21/265; G01P 1/023; G01P 15/18
See application file for complete search history.

(56) References Cited

U.S. PATENT DOCUMENTS

2008/0157999 A1*  7/2008  Koutari ................ G01C 21/265
                                                        340/4.4
2011/0153207 A1*  6/2011  Suzaki ............... G01C 21/3688
                                                        701/532
(Continued)

FOREIGN PATENT DOCUMENTS

JP    2011-169593 A    9/2011
JP    2020-33583       1/2020
(Continued)

OTHER PUBLICATIONS

Search Report dated Jul. 20, 2023 issued in corresponding European Application No. 21760888.4.
(Continued)

*Primary Examiner* — Christian Chace
*Assistant Examiner* — Nicholas Stryker
(74) *Attorney, Agent, or Firm* — Nath, Goldberg & Meyer; Jerald L. Meyer

(57) ABSTRACT

A navigation device includes an outer panel and an inertial sensor. The outer panel includes a pair of side plates separated from each other in a first direction and facing each other. A pair of fixing portions are provided on the pair of side plates. The pair of fixing portions are fixed to moving body-side fixing members. The inertial sensor is provided inside surrounded by the outer panel and arranged at a position sandwiched between the pair of fixing portions in the first direction.

5 Claims, 6 Drawing Sheets

(51) Int. Cl.
*G01P 1/02* (2006.01)
*G01P 15/18* (2013.01)

(56) References Cited

U.S. PATENT DOCUMENTS

2011/0164388 A1* 7/2011 Ozaki .................... G01C 21/26
  361/725
2020/0307693 A1* 10/2020 Kobayashi ............. B62D 49/02

FOREIGN PATENT DOCUMENTS

| JP | 2020-33587 | 1/2020 | |
| WO | WO-2015064203 A1 * | 5/2015 | ............. B60R 21/01 |
| WO | 2019/129887 A1 | 7/2019 | |
| WO | 2019/156585 A1 | 8/2019 | |

OTHER PUBLICATIONS

International Search Report issued on Mar. 30, 2021 for application No. PCT/JP2021/001253.

* cited by examiner

NAVIGATION DEVICE AND METHOD OF MANUFACTURING NAVIGATION DEVICE

CROSS REFERENCE TO RELATED APPLICATION

This application is a Continuation of PCT Application No. PCT/JP2021/001253, filed on Jan. 15, 2021, and claims the priority of Japanese Patent Application No. 2020-033583 filed on Feb. 28, 2020, and Japanese Patent Application No. 2020-033587 filed on Feb. 28, 2020, the entire contents of all of which are incorporated herein by reference.

BACKGROUND

The present disclosure relates to a navigation device including an inertial sensor and a method of manufacturing a navigation device.

Japanese Unexamined Patent Application Publication No. 2011-169593 describes a car navigation device including an inertial sensor.

SUMMARY

It is desirable that an inertial sensor mounted on a navigation device makes the same movement as the movement of a moving body such as a vehicle in which the navigation device is equipped. In conventional car navigation devices, consideration is not given to the installation position of the inertial sensor with respect to the fixed position of a vehicle side member. Therefore, when the installation position of the inertial sensor is far from the fixed position or the like, a deviation between the behavior of the inertial sensor and the behavior of the vehicle may become large due to deformation or vibration generated in the car navigation device caused by external forces or vibrations. As a result, the position of the vehicle on which the car navigation device is mounted may not be detected with high accuracy.

A first aspect of one or more embodiments provides a navigation device including: an outer panel including a pair of side plates separated from each other in a first direction and facing each other; a pair of fixing portions provided on the pair of side plates and to be fixed to moving body-side fixing members; and an inertial sensor provided inside surrounded by the outer panel and arranged at a position sandwiched between the pair of fixing portions in the first direction.

A second aspect of one or more embodiments provides a method of manufacturing a navigation device including: in a pair of side plates of an outer panel in the navigation device that are separated from each other in a first direction, face each other, and include a pair of fixing portions to be fixed to moving body-side fixing members, arranging a flat plate-shaped chassis in an orientation orthogonal to the pair of side plates at a position not corresponding to positions of the pair of fixing portions between the pair of side plates when viewed from the first direction; attaching a sensor board on which an inertial sensor is mounted to a bracket having a predetermined shape; and fixing the bracket to a portion in the chassis where an amplitude is smaller than an amplitude at other portions in the chassis when vibration is applied to the navigation device, to arrange the inertial sensor at a position sandwiched between the pair of fixing portions in the first direction.

DETAILED DESCRIPTION

Figure 1:
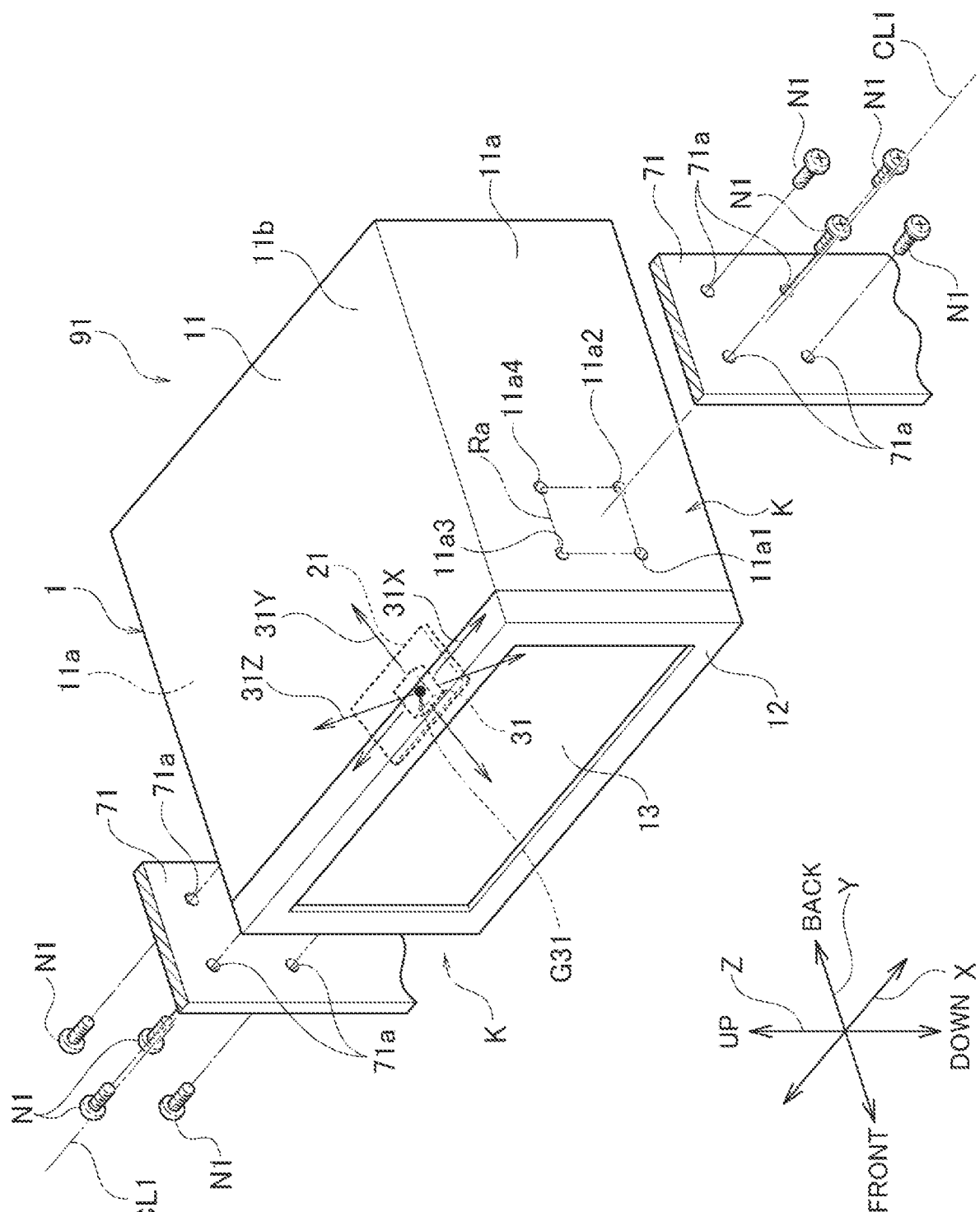
FIG. 1 is an assembled perspective view illustrating a navigation device 91, which is a navigation device according to one or more embodiments, and a mounting structure thereof.

A navigation device according to one or more embodiments will be described by taking the navigation device 91 shown in FIG. 1 as an example. FIG. 1 is a perspective assembly view showing a structure of the navigation device 91 for mounting to vehicle-side fixing members 71, which are moving body-side fixing members. For convenience of explanation, the directions of up, down, left, right, front, and back in the navigation system 91 are defined by the arrow directions shown in FIG. 1. Further, an axis extending in the left-right direction is referred to as an X-axis, an axis extending in the front-back direction is referred to as a Y-axis, and an axis extending in the up-down direction is referred to as a Z-axis. The direction in which the X-axis extends may be referred to as a first direction.

The navigation device 91 is mounted on a moving body such as a vehicle, an airplane, or a ship. The navigation device 91 in the following description is a car navigation device mounted on a vehicle.

As shown in FIG. 1, the navigation device 91 includes a substantially hexahedral body 1 in appearance. The body 1 includes a front panel portion 12 in the front, and the top and left and right sides are covered by an outer panel 11. The front panel portion 12 includes an image display 13 for displaying images. The outer panel 11 includes an upper top plate 11$b$ and a pair of left and right side plates 11$a$. The pair of side plates 11$a$ are separated from each other in the left and right directions and face each other in parallel.

Each side plate 11$a$ is provided with a fixing portion K on the front side into which a male screw can be screwed. In this example, a plurality of (four in this example) fixing portions 11$a$1 to 11$a$4 are provided as the fixing portion K. The fixing portions 11$a$1 to 11$a$4 are provided symmetrically at positions on the left and right side plates 11$a$.

In each side plate 11$a$, the fixing portions 11$a$1 to 11$a$4 are arranged at the vertices of a rectangle Ra whose sides extend up and down and to the front and back. Specifically, the fixing portion 11$a$1 is located at the front lower position, the fixing portion 11$a$2 is located at the rear lower position, the fixing portion 11$a$3 is located at the front upper position, and the fixing portion 11$a$4 is located at the rear upper position. In this way, when the four fixing portions 11$a$1 to 11$a$4 are at the vertices of the quadrangle, a hypothetical axis extending in the left-right direction through the diagonal center position of the quadrangle is defined as a fixed axis CL1.

A sensor board 21 on which the inertial sensor 31 is mounted is arranged at the front inside the body 1. The inertial sensor 31 is arranged at a position sandwiched between the pair of fixing portions K. The inertial sensor 31 is set with detection reference axes 31X, 31Y, and 31Z, which are three orthogonal axes. The inertial sensor 31 is a 6-axis sensor that detects acceleration in each axial direction and angular acceleration around each axis.

The vehicle-side fixing members 71 are a pair of members provided on the dashboard of the vehicle and separated to the left and right, for example. The pair of vehicle-side fixing members 71 are arranged apart from each other at an interval with which the pair of vehicle-side fixing members 71 are in substantially close contact with the pair of side plates 11a of the navigation device 91. The vehicle-side fixing members 71 include four through-holes 71a corresponding to the fixing portions 11a1 to 11a4 in the side plates 11a of the navigation device 91.

In this configuration, the navigation device 91 is fixed to the vehicle-side fixing members 71 by passing the fixing screws N1 through the through-holes 71a of the vehicle-side fixing members 71, and screwing and tightening the fixing screws N1 to the fixing portions 11a1 to 11a4 of the navigation device 91. Hereinafter, the orientation of the navigation device 91 in a state where the navigation device 91 is fixed to the vehicle-side fixing members 71 is referred to as an installation orientation.

Figure 2:
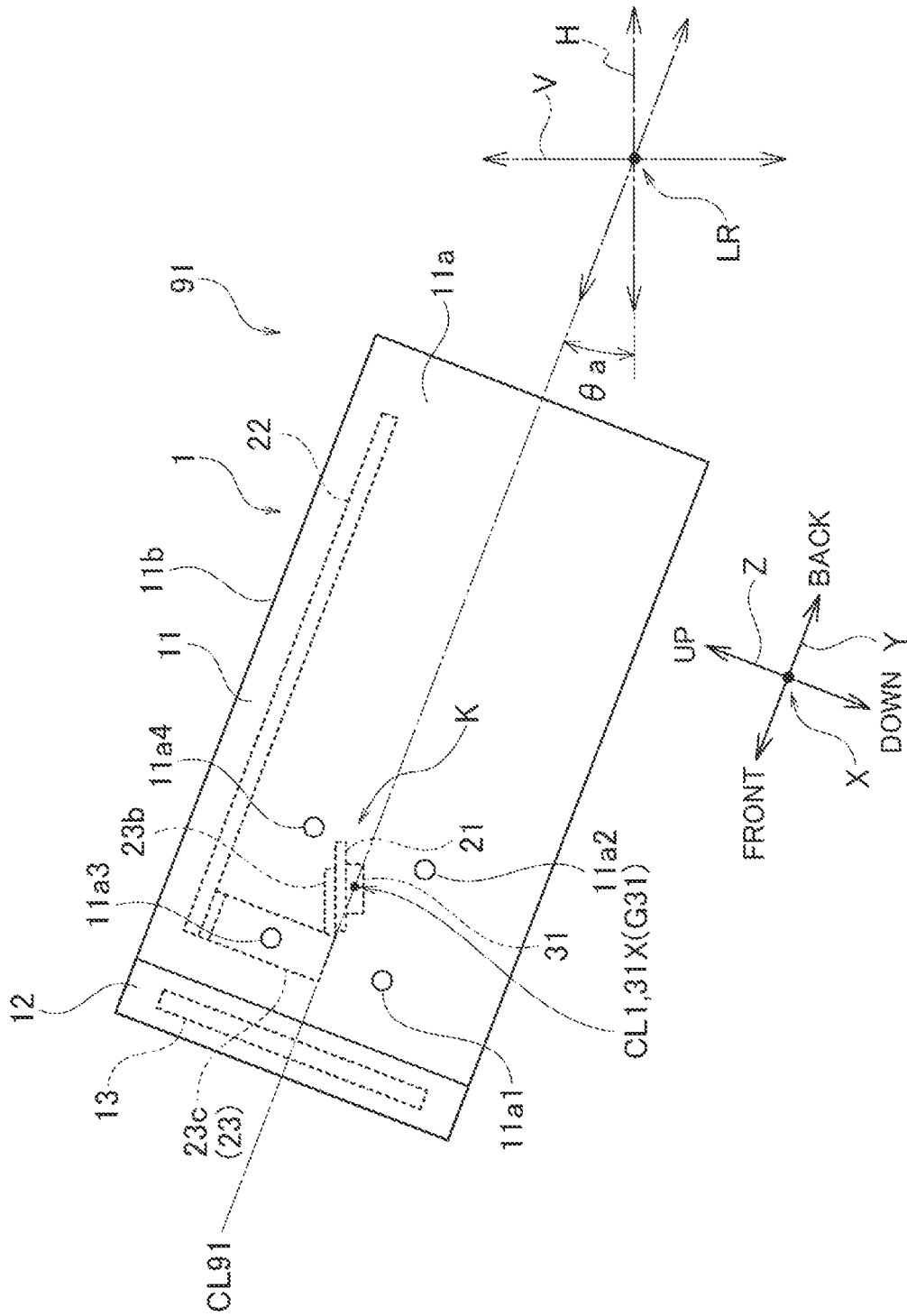
FIG. 2 is a left side view illustrating the mounting orientation of the navigation device 91.

FIG. 2 is a left side view of the navigation device 91 in the installation orientation. As shown in FIG. 2, the direction of gravity is defined as a vertical axis V (vertical axis), the axis in the front-back direction perpendicular to the vertical axis V is defined as a horizontal axis H (horizontal front-back axis), and the axis in the left-right direction perpendicular to the vertical axis V (front and back direction in the page space of FIG. 2) is defined as the horizontal left-right axis LR. The X-axis of the navigation device 91 in the installation orientation coincides with the horizontal left-right axis LR, and the Y-axis and Z-axis are set in directions rotated clockwise by an angle θa with respect to the horizontal axis H and the vertical axis V, respectively. That is, in the installation orientation, the navigation device 91 is in an inclined orientation in which the front side is tilted upward by an angle θa with respect to the horizontal direction.

As shown in FIG. 2, the chassis 22 and a bracket 23 are provided inside the body 1 of the navigation device 91. The chassis 22 is arranged parallel to the top plate 11b above the vertical center line CL91 of the navigation device 91. The chassis 22 is arranged at a position that does not correspond to the position of the fixing portions K, in other words, at a position separated from the fixing portions K when viewed from the X-axis direction. The bracket 23 is fixed to the chassis 22 and supports the sensor board 21 so as to be located below the chassis 22.

In the installation orientation, the inertial sensor 31 is arranged at a position where it intersects with the fixed axis CL1. For example, the inertial sensor 31 is arranged so that the detection reference axis 31X coincides with the fixed axis CL1.

Figure 3:
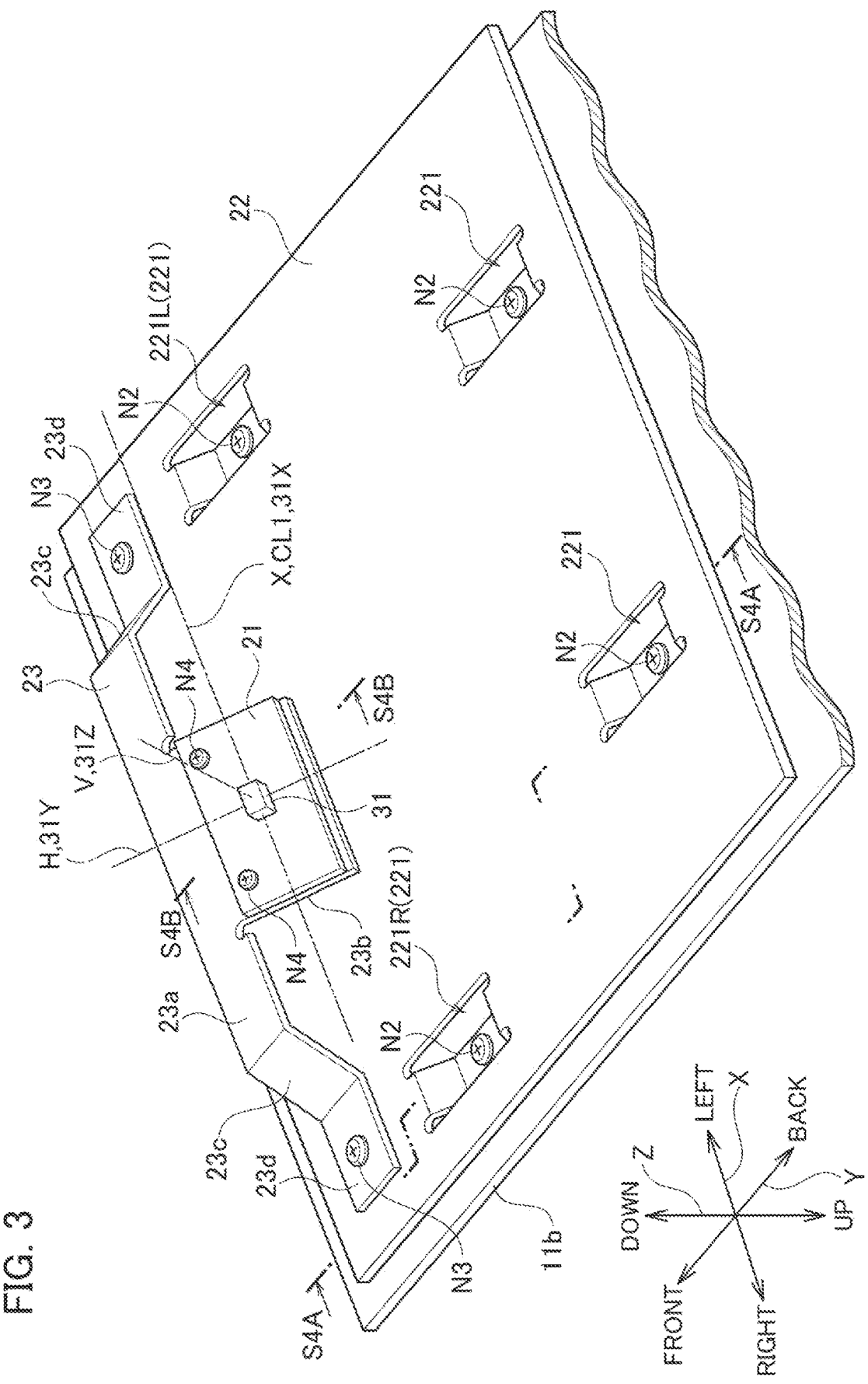
FIG. 3 is a perspective view illustrating a chassis 22 and a bracket 23 included in the navigation device 91.
Figure 4:
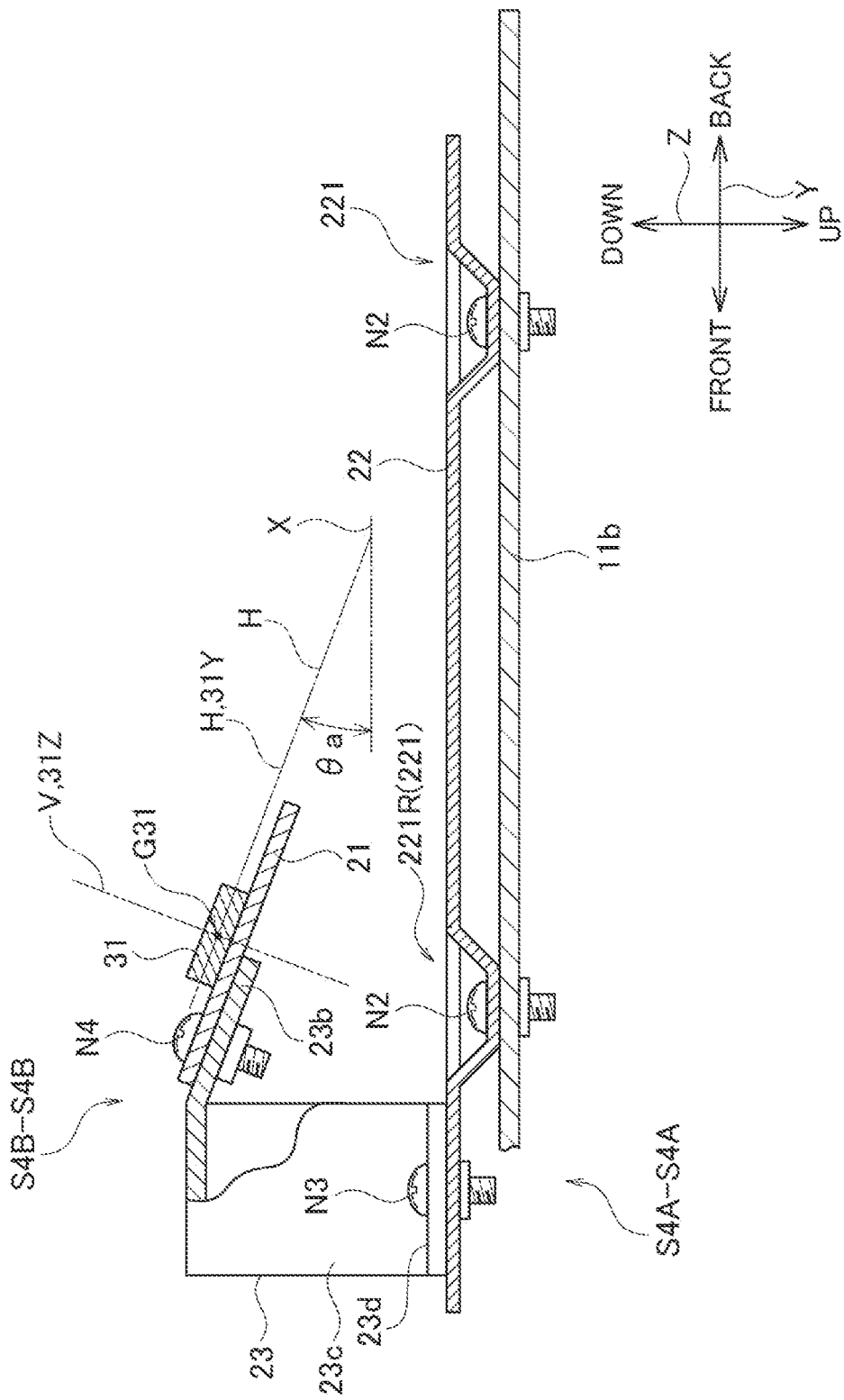
FIG. 4 is a cross-sectional view taken at the S4A-S4A position and the S4B-S4B position in FIG. 3.
Figure 5:
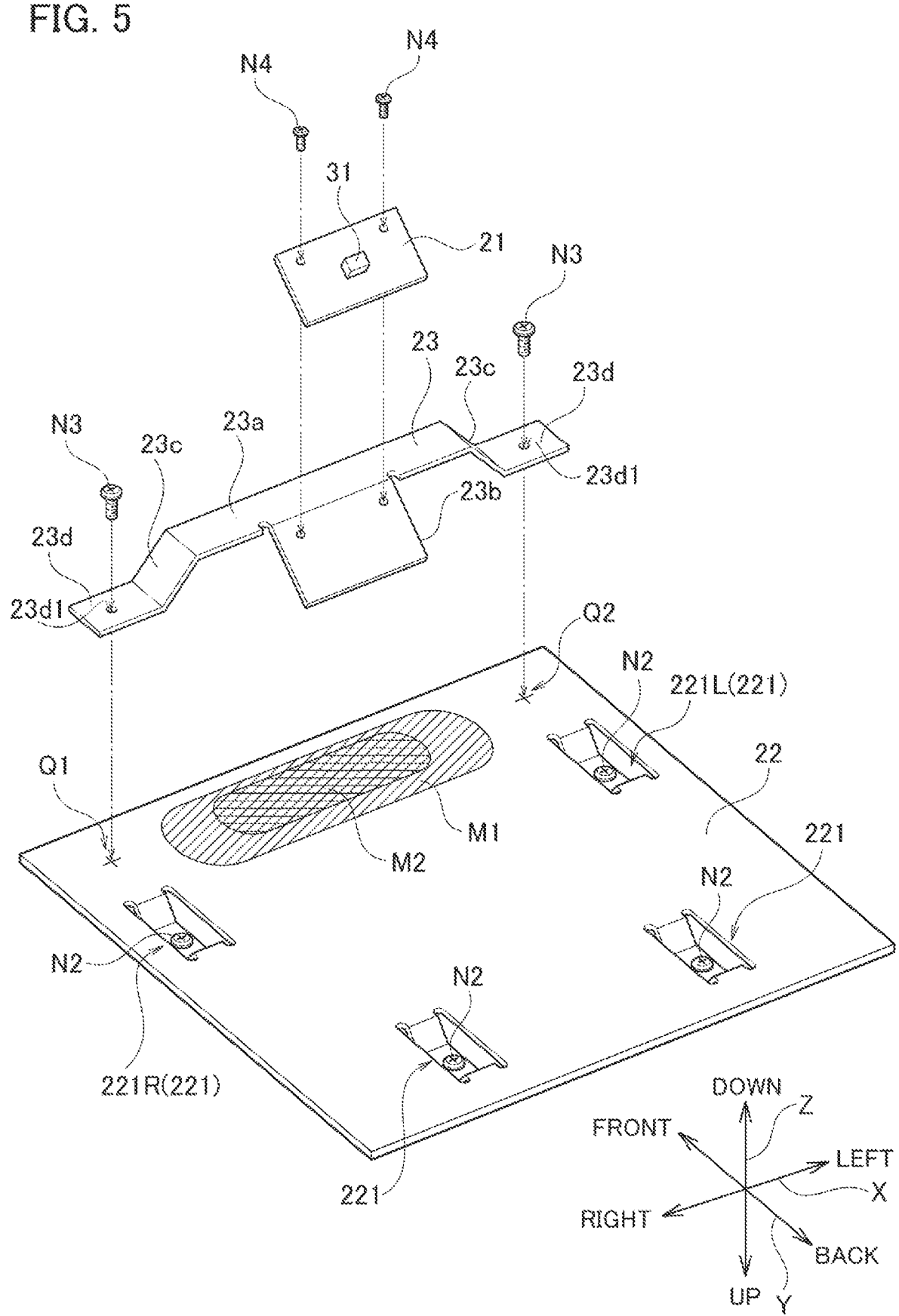
FIG. 5 is an exploded perspective view including a simulation result of the amplitude response to the external vibration of the chassis 22.

FIG. 3 is a perspective view showing the mounting mode of the chassis 22, the bracket 23, the sensor board 21, and the inertial sensor 31. FIG. 4 is a cross-sectional view taken at the S4A-S4A position and the S4B-S4B position in FIG. 3. FIG. 5 is an exploded perspective view showing a method of attaching the bracket 23 and the sensor board 21 to the chassis 22. FIGS. 3 and 5 are perspective views of the relevant portion viewed diagonally from the lower right rear, and are shown so that the upper side in the page space is the lower side in the Z axis by inverting the top and bottom. In addition, FIG. 5 also shows regions M1 and M2 (details will be described later), which are simulation results of the amplitude response to the external vibration of the chassis 22.

As shown in FIGS. 3 and 5, the chassis 22 is made of metal and is formed in a substantially rectangular plate shape. The chassis 22 includes a plurality of fixing portions 221 formed by cutting and raising for screwing to the top plate 11b of the outer panel 11. In this example, the chassis 22 includes a pair of left-right separated fixing portions 221L and 221R at the front and a pair of left-right separated fixing portions 221 at the rear. The chassis 22 is fixed to the outer panel 11 by means of fixing screws N2, each of which is tightened to an unillustrated female thread formed in the top panel 11b.

Meanwhile, the bracket 23 is made of a metal plate and includes a base 23a, an overhanging portion 23b, a pair of inclined connecting portions 23c, and a pair of seat portions 23d. The base 23a is an elongated plate-shaped portion extending in the left-right direction. The overhanging portion 23b is a rectangular plate-shaped portion that is inclined backward and diagonally upward in the central portion in the left-right direction of the base 23a. The inclined connecting portions 23c are portions that extend outwardly and diagonally upward from both left and right ends of the base 23a to connect the base 23a and the seat portions 23d. The seat portions 23d are plate-shaped portions having a through-hole 23d1 (see FIG. 5) through which the threaded portion of the fixing screw N3 is inserted, and extend parallel to the base 23a from the tip of the inclined connecting portions 23c. The upper surfaces of the pair of seat portions 23d are included in the same hypothetical plane. The base 23a connects the pair of seat portions 23d and connects the pair of inclined connecting portions 23c.

Assuming that the entirety of the inclined connecting portion 23c and the seat portion 23d is a leg, the base 23a connects the pair of legs. The pair of legs are attached to the chassis 22 at positions separated from each other in the X-axis direction.

The sensor board 21 is screwed to the lower surface of the overhanging portion 23b by means of fixing screws N4. The inertial sensor 31 is mounted on the lower surface of the sensor board 21.

The pair of seat portions 23d of the bracket 23 are fixed to the fixing portions Q1 and Q2 (see FIG. 5) near the pair of front corners of the four corners of the chassis 22 by means of fixing screws N3. Further, in the vicinity of the pair of the front corners of the chassis 22, the fixing portions 221L and 221R separated to the left and right are arranged as described above, and the chassis 22 is fixed to the top plate 11b. Therefore, the fixing portions Q1 and Q2 are portions having higher rigidity than the central portion of the chassis 22.

As shown in FIGS. 3 and 4, the sensor board 21 is fixed to the bracket 23, and the bracket 23 is attached to the chassis 22. In this state, among the detection reference axes 31X, 31Y, and 31Z of the inertial sensor 31, the detection reference axis 31X coincides with the fixed axis CL1 of the navigation device 91 as described above. Further, the detection reference axis 31Y extends parallel to the horizontal axis H, and the detection reference axis 31Z extends parallel to the Z axis.

Figure 6:
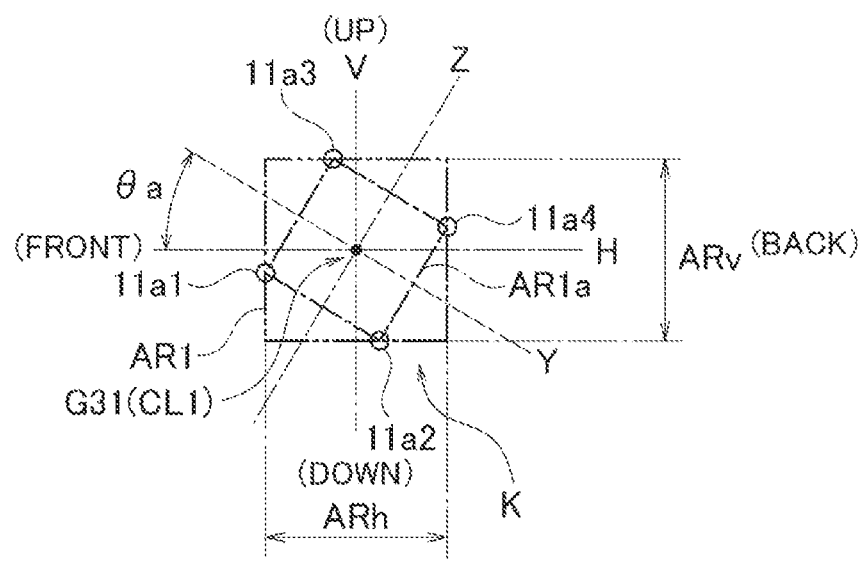
FIG. 6 is a first schematic diagram for describing a setting range of a center of gravity position G31 of an inertial sensor 31 in the navigation device 91.

Next, the details of the mounting position of the inertial sensor 31 in the above configuration will be described with reference to FIG. 6. FIG. 6 is a diagram for describing the positional relationship between the inertial sensor 31 and the fixing portions 11a1 to 11a4 in the installation orientation of the navigation device 91, and is a schematic view seen from the left side of the fixed axis CL1.

As shown in FIG. 6, the inertial sensor 31 is set so that the center of gravity position G31 coincides with the position of the fixed axis CL1. In the navigation device 91, the center of gravity position G31 is not limited to coinciding with the fixed axis CL1, and may be set within the range AR1.

The range AR1 is a rectangular range surrounded by a range ARh in the horizontal direction (horizontal axis H direction) and a range ARv in the vertical direction (vertical axis V direction). Specifically, the horizontal range ARh is the range between the center of the fixing portion 11a1 at the front position and the center of the fixing portion 11a4 at the last position in the horizontal axis H direction among the four fixing portions 11a1 to 11a4. The vertical range ARv is a range between the center of the fixing portion 11a3 at the uppermost position and the center of the fixing portion 11a2 at the lowest position in the vertical axis V direction.

When an external force or vibration in one direction is applied to the navigation device 91, deformation of bending or twisting around the horizontal axis H and around the vertical axis V does not substantially occur in the inner portion of the range AR1 in the side plates 11a and the vehicle-side fixing members 71. Therefore, when the center of gravity position G31 is within the range AR1, the navigation device 91 suppresses the deviation between the behavior of the inertial sensor 31 and the behavior of the vehicle, and can detect the position of the host vehicle with higher accuracy than in the case where the center of gravity position G31 is located in a range other than the range AR1. As a result, the navigation device 91 improves the detection accuracy of the position of the host vehicle.

Moreover, it is better that the center of gravity position G31 is within the narrower range AR1a included in the range AR1. The range AR1a is a quadrangular range in which the center positions of the fixing portions 11a1 to 11a4 are connected by line segments.

When an external force or vibration in one direction is applied to the navigation device 91, the entire side plates 11a and the vehicle-side fixing members 71 may be deformed around an axis such as the Y-axis or the Z-axis, which are inclined with respect to the horizontal axis H and the vertical axis V. Even in this case, the inner portion of the range AR1a in the side plates 11a and the vehicle-side fixing members 71 is not affected by the deformation. Therefore, when the center of gravity position G31 is in the range AR1a, the navigation device 91 further suppresses the deviation between the behavior of the inertial sensor 31 and the behavior of the vehicle, and can detect the position of the host vehicle with higher accuracy than in the case where the center of gravity position G31 is in the range AR1. As a result, the navigation device 91 further improves the detection accuracy of the position of the host vehicle.

Further, as a response simulation for when vibration is applied from the outside, the amplitude distribution of the chassis 22 has been obtained when the vehicle-side fixing members 71 are vibrated in a random vibration direction in the mounting orientation. FIG. 5 shows the results of classifying the obtained amplitude distribution into three stages of small, medium, and large according to the magnitude of the amplitude. That is, the region M2 with cross-hatching is a region having a large amplitude, and the region M1 with single hatching is a region having a medium amplitude. The region M2 is located inside the region M1. The region other than the region M2 and the region M1 without hatching is a region having a small amplitude. The regions M1 and M2 can be regarded as regions in which resonance is generated with respect to the vibration applied from the outside.

As shown in FIG. 5, the regions M1 and M2 are distributed in the front left-right central portion of the chassis 22 extending in the left-right direction. When the bracket 23 is fixed to the region M1 and the region M2, it is predicted that the resonance of the chassis 22 greatly affects the operation of the inertial sensor 31. Therefore, in the navigation device 91, the bracket 23 is fixed to portions of the chassis 22 where the amplitude is small. Specifically, in the chassis 22, the fixing portions Q1 and Q2 that substantially correspond to the region M1 in the front-back direction and are outside the region M1 in the left-right direction are selected, and the bracket 23 is fixed at the fixing portions Q1 and Q2.

In this way, the bracket 23 is fixed to the chassis 22 at the fixing portions Q1 and Q2. Therefore, as compared with the case where the bracket 23 is fixed to the region M1 or M2 of the chassis 22, the inertial sensor 31 is less likely to be affected by the excessive vibration due to the resonance of the chassis 22 even if an external force such as an external vibration is applied. That is, the inertial sensor 31 on the sensor substrate 21 fixed to the bracket 23 is unlikely to vibrate excessively even if the body 1 vibrates. As a result, the navigation device 91 can detect the position of the host vehicle with high accuracy even if external vibration is applied.

The navigation device 91 including the above-described configuration is manufactured by the following method. First, the navigation device 91 includes the pair of side plates 11a that are separated from each other in the X-axis direction, which is the first direction, and face each other in parallel. Further, the navigation device 91 includes the outer panel 11 having the fixing portions K (11a1 to 11a4) on the pair of side plates 11a to be fixed to the vehicle-side fixing members 71. The fixing portions K fix the outer panel 11 to the pair of vehicle-side fixing members 71 located on both outer sides of the pair of side plates 11a by means of the fixing screws N1.

As a manufacturing method, the flat plate-shaped chassis 22 is arranged in an orientation orthogonal to the side plates 11a at a position not corresponding to the positions of the fixing portions 11a1 to 11a4 between the pair of side plates 11a when viewed from the X-axis direction. That is, the chassis 22 is arranged at a position separated from the fixing portions 11a1 to 11a4 when viewed from the X-axis direction.

In addition, the sensor board 21 on which the inertial sensor 31 is mounted is attached to the bracket 23 having a predetermined shape. The bracket 23 is fixed to the chassis 22 at portions of the chassis 22 where the amplitude when vibration is applied to the navigation device 91 is smaller than the amplitude at other portions, and the inertial sensor 31 is arranged at a position sandwiched between the pair of fixing portions K when viewed from the X-axis direction. Desirably, the inertial sensor 31 is arranged at a position corresponding to the position of the fixing portions K when viewed from the X-axis direction. The state in which the inertial sensor 31 is arranged at a position corresponding to the position of the fixing portions K when viewed from the X-axis direction means that the inertial sensor 31 is located at a position where the inertial sensor 31 overlaps the fixing portions K when viewed from the X-axis direction. At this time, the positions of the inertial sensor 31 in the Y-axis and Z-axis directions are substantially the same as the positions of the fixing portions K in the Y-axis and Z-axis directions.

The other portions in the chassis 22 are regions M1 and M2 where a relatively large amplitude is generated by resonance when vibration is applied to the navigation device 91.

The present invention is not limited to one or more embodiments described above, and various modifications can be made without departing from the scope of the present invention.

The number of fixing portions included in the fixing portion K is not limited to four as described above. The number of fixing portions included in the fixing portion K may be two or three, for example.

Figure 7:
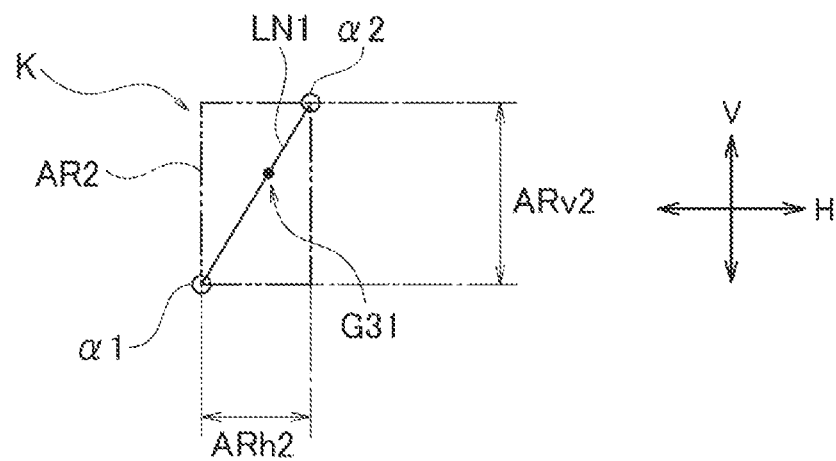
FIG. 7 is a second schematic diagram for describing a setting range of the center of gravity position P31.

As shown in FIG. 7, when the fixing portion K is composed of two fixing portions a1 and a2, the center of gravity position G31 of the inertial sensor 31 may be set within the range AR2. The range AR2 is a range surrounded by a range ARh2 in the horizontal direction (horizontal axis H direction) and a range ARv2 in the vertical direction (vertical axis V direction). Specifically, the horizontal range ARh2 is the range between the centers of the fixing portion α1 at the front position and the fixing portion a2 at the last position in the horizontal axis H direction of the two fixing portions α1 and α2. The vertical range ARv2 is a range between the centers of the fixing portion α2 at the uppermost position and the fixing portion α1 at the lowest position in the vertical axis V direction.

Figure 8:
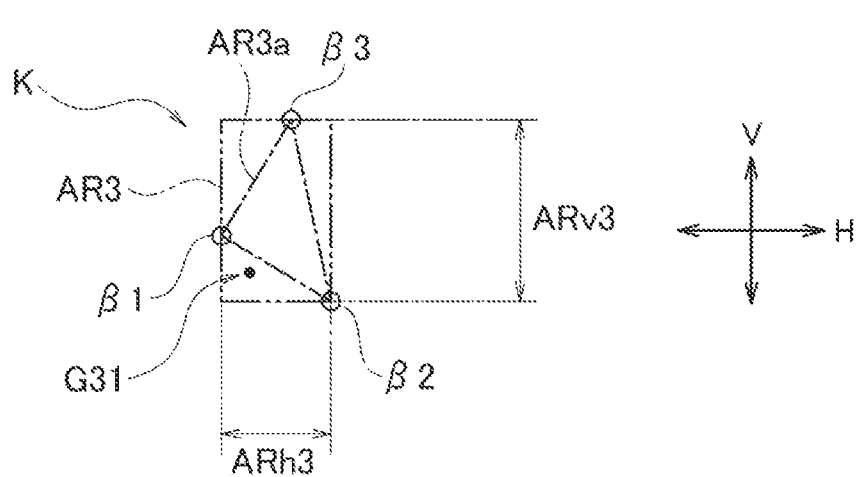
FIG. 8 is a third schematic diagram for describing a setting range of the center of gravity position P31.

Furthermore, as shown in FIG. 8, when the fixing portion K is composed of three fixing portions β1 to β3, the center of gravity position G31 of the inertial sensor 31 may be set within the range AR3. The range AR3 is a range surrounded by a range ARh3 in the horizontal direction (horizontal axis H direction) and a range ARv3 in the vertical direction (vertical axis V direction). Specifically, the horizontal range ARh3 is the range between the centers of the fixing portion β1 at the front position and the fixing portion β2 at the last position in the horizontal axis H direction among the three fixed portions β1 to β3. The vertical range ARv3 is a range between the centers of the fixing portion β3 at the uppermost position and the fixing portion β2 at the lowest position in the vertical axis V direction.

When an external force or vibration in one direction is applied to the navigation device 91, deformation of bending or twisting around the horizontal axis H and around the vertical axis V does not substantially occur in the inner portion of the range AR2 or AR3 in the side plates 11a and the vehicle-side fixing members 71. Therefore, when the center of gravity position G31 is within the range AR2 or AR3, the navigation device 91 suppresses the deviation between the behavior of the inertial sensor 31 and the behavior of the vehicle, and can detect the position of the host vehicle with higher accuracy than in the case where the center of gravity position G31 is located in a range other than the range AR2 or AR3. As a result, the navigation device 91 improves the detection accuracy of the position of the host vehicle even when the fixing portion K is composed of two or three fixing portions.

When the fixing portion K includes two fixing portions, it is better that the center of gravity position G31 is on the line segment LN1 connecting the fixing portion α1 and the fixing portion α2 shown in FIG. 7. When the fixing portion K includes three fixing portions, it is better that the center of gravity position G31 is within the range AR3a shown in FIG. 8. The range AR3a is a triangular range connecting the center positions of the fixing portions β1 to β3 by line segments.

When an external force or vibration in one direction is applied to the navigation device 91, the entire side plates 11a and the vehicle-side fixing members 71 may be deformed around an axis such as the Y-axis or the Z-axis, which is inclined with respect to the horizontal axis H and the vertical axis V. Even in this case, the portion on the line segment LN1 and the inner portion of the range AR3a in the side plates 11a and the vehicle-side fixing members 71 is not affected by the deformation. Therefore, when the center of gravity position G31 is on the line segment LN1 or in the range AR3a, the navigation device 91 further suppresses the deviation between the behavior of the inertial sensor 31 and the behavior of the vehicle, and can detect the position of the host vehicle with higher accuracy than in the case where the center of gravity position G31 is in the range AR2 or AR3. As a result, the navigation device 91 further improves the detection accuracy of the position of the host vehicle.

The inertial sensor 31 is not limited to the board mounting type. The inertial sensor 31 may be attached directly to the base 23a of the bracket 23. That is, the inertial sensor 31 may be indirectly attached to the base 23a of the bracket 23 via another member such as the sensor board 21, or may be directly attached to the base 23a.

The navigation device 91 may also mounted on a moving body other than a vehicle. When the navigation device 91 is mounted on a moving body other than a vehicle, all of the instances of the word "vehicle" in the above description can be replaced with "moving body".

In accordance with the navigation device and the method of manufacturing a navigation device according to one or more embodiments, it is possible to improve the detection accuracy of the position of a moving body.

What is claimed is:

1. A navigation device comprising:
   an outer panel including a pair of side plates separated from each other in a first direction and facing each other;
   a plurality of fixing portions provided on the pair of side plates and to be fixed to moving body-side fixing members; and
   an inertial sensor provided inside surrounded by the outer panel and arranged at a position sandwiched between the plurality of fixing portions in the first direction,
   wherein a center of gravity position of the inertial sensor is located in a range between a front position and a last position of the plurality of fixing portions in a horizontal front-back axis direction, and between an uppermost position and a lowest position of the plurality of fixing portions in a vertical axis direction.

2. The navigation device according to claim 1, further comprising:
   a chassis arranged orthogonally to the pair of side plates; and
   a bracket including a pair of legs attached to the chassis at positions separated from each other in the first direction and a base connecting the pair of legs, and the inertial sensor is attached directly or indirectly to the base of the bracket,
   wherein the pair of fixing portions face each other in a parallel relationship.

3. The navigation device according to claim 2, wherein the chassis is arranged at a position that does not correspond to positions of the fixing portions when viewed from the first direction.

4. The navigation device according to claim 1,
   wherein the navigation device comprises a set of four fixing portions provided on the pair of side plates,
   wherein the four fixing portions are at vertices of a quadrangle, and a hypothetical axis extending in the first direction through a diagonal center position of the quadrangle is defined as a fixed axis, and wherein the center of gravity position coincides with a position of the fixed axis.

5. A method of manufacturing a navigation device comprising:

in a pair of side plates of an outer panel in the navigation device that are separated from each other in a first direction, face each other, and include a plurality of fixing portions to be fixed to moving body-side fixing members, arranging a flat plate-shaped chassis in an orientation orthogonal to the pair of side plates at a position not corresponding to positions of the plurality of fixing portions between the pair of side plates when viewed from the first direction;

attaching a sensor board on which an inertial sensor is mounted to a bracket having a predetermined shape; and fixing the bracket to a portion in the chassis where an amplitude is smaller than an amplitude at other portions in the chassis when vibration is applied to the navigation device, to arrange the inertial sensor at a position sandwiched between the plurality of fixing portions in the first direction, wherein the method of manufacturing a navigation device further comprises setting a center of gravity position of the inertial sensor in a range between a front position and a last position of the two or more fixing portions in a horizontal front-back axis direction, and between an uppermost position and a lowest position of the two or more fixing portions in a vertical axis direction.

* * * * *